0
United States Patent Office 2,776,214
Patented Jan. 1, 1957

2,776,214

METHOD OF TREATING EGG WHITES

William E. Lloyd, Homewood, and Louis A. Harriman, Chicago, Ill., assignors to Armour and Company, Chicago, Ill., a corporation of Illinois No Drawing. Application March 9, 1953,
Serial No. 341,327

3 Claims. (Cl. 99—161)

This invention relates to the treating of liquid eggs to eliminate pathogenic and other bacteria from the eggs while at the same time retaining the natural functional properties of the eggs. The method of this invention has its greatest utility in treating liquid egg whites.

This application is a continuation-in-part of our co-pending application Serial No. 120,228, filed October 7, 1949, now abandoned.

One of the most important problems confronting the egg industry today is the prevention of entry and growth of pathogenic bacteria in eggs prior to freezing. The presence of pathogenic bacteria in liquid eggs is highly undesirable and may lead to serious cases of food poisoning.

Of the pathogenic bacteria found in liquid eggs, the Salmonella group is the most important to be considered. This group may be found especially in the eggs laid by sick hens, or by hens which are carriers of Salmonella.

Salmonella which are common to fowl have been found in man and thus indicate the importance of the transmission of infections by eggs and egg products. These pathogens are also widely distributed in other mammals and birds, and are primarily intestinal parasites.

The presence of Salmonella may cause food poisoning, enteritis or typhoid-like infections. If liquid eggs are eaten which are contaminated with Salmonella, violent gastro-intestinal disturbances may be produced; nor will ordinary cooking procedures render the eggs safe because of the presence of an endotoxin which is very resistant to heat. It is also interesting to note in this connection that if dried eggs contaminated with Salmonella are reconstituted and held for any prolonged period of time at ordinary room temperature, similar food poisoning attacks may occur.

Salmonella are Gram-negative, non-spore-forming rods. They are aerobic and facultatively anaerobic and, with few exceptions, all species are motile.

Some specific examples of this group of pathogens and the sources from which they have been isolated are: *Salmonella pullorum* which has been found in spray-dried eggs and is the cause of white diarrhea in young chicks. (Authorities disagree as to wether this bacterium is pathogenic to man, but its presence is indicative of a contamination which may be harmful to man); *Salmonella enteritidis* which has been found in chicken eggs; *Salmonella tennessee* which ha been found in spray-dried eggs; *Salmonella typhimurium* which has been found in the blood stream of chickens and in duck eggs; and *Salmonella typhi*.

Other pathogenic bacteria have been isolated from liquid eggs, although they are not as important a source of food poisoning as the Salmonella group. Among such bacteria are *Bacillus proteus* and *Bacillus pyocyaneus* which are found in soil and filth.

The problem of bacterial contamination of egg products is particularly acute for egg whites. Whole eggs and yolks can be pasteurized with fair success by heating at temperatures and for periods of time which will not coagulate the whole eggs and yolks. However, liquid egg whites have such a delicate structure that they cannot be heated in the same manner as whole eggs or yolks, and therefore pasteurization of egg whites is entirely impractical.

While egg whites can be heated to temperatures as high as 140° F. without coagulating, they begin to lose their important functional properties at considerably lower temperatures. It is generally agreed that egg whites should not be heated appreciably above 130° F. if their desired functional properties are to be preserved. From a knowledge of the temperatures generally required to effectively kill bacteria, it can be readily seen that heat sterilization or pasteurization is not a feasible process at temperatures below 130° F. Therefore, all efforts to heat sterilize or pasteurize egg whites while preserving their functional properties have failed. Moreover, although the egg-treating art has long sought an answer to the problem of sterilizing egg whites without damaging their functional properties, no answer has heretofore been provided.

It is therefore the principal object of the present invention to provide a method whereby a commercially sterile liquid egg white product is obtained without impairing the functional characteristics of the egg whites. Other specific objects and advantages will appear as the specification proceeds.

The method of this invention is based in part on the discovery that the indigenous catalase in liquid egg whites can be inactivated sufficiently by heat without impairing the functional properties of the egg whites to permit direct addition of hydrogen peroxide to the egg whites in bactericidal concentrations. This is believed to be highly unexpected. Egg whites are very rich in catalase, containing several times as much catalase as whole eggs and many times as much catalase as other foods, such as milk, meat, etc. Moreover, as indicated above, egg whites cannot be heated above about 130° F. without appreciably impairing their desired functional properties. Further, while it is known that catalase can be inactivated by heat, the temperatures known to be required are such that at temperatures below 130° F. it would have been thought no significant inactivation of catalase could be obtained within a practical period of time for an egg-treating process.

In practicing the method of this invention, the first step is the heating of the liquid egg whites to a temperature above 100° F. but not above 130° F. Surprisingly enough, within this temperature range, it has been found possible to inactivate the indigenous catalase in the egg whites without impairing their desired functional properties. The preferred temperature range for this purpose appears to be from about 115 to 125° F. For example, at a temperature in the neighborhood of 120° F., the indigenous catalase in the egg whites is substantially inactivated in about 2 minutes. More generally, the heating at the specified temperatures can be satisfactorily carried out at times ranging from ½ to 5 minutes or, preferably, from about 1 to 3 minutes.

After the preliminary heat treatment to inactivate the catalase, the hydrogen peroxide can be added in bactericidal concentrations to effect sterilization without any adverse effects on the egg whites. However, if hydrogen peroxide is added in bactericidal concentrations to egg whites without a preliminary heat treatment to inactivate the indigenous catalase, the process will fail due to the rapid breakdown into oxygen and water of the hydrogen peroxide in the presence of the high concentrations of active catalase. This breakdown has two highly undesirable results. One of them, which is immediately apparent when this operation is observed without the preliminary inactivation of the catalase, is an intense foaming of the egg whites, which causes the egg whites to be formed into a foam of considerable stability. The other undesirable result is that the oxygen in the hydrogen peroxide is liberated by the catalase in the form of molecular oxygen (as distinguished from nascent oxygen), causing the bactericidal action of the hydrogen peroxide to be ineffective.

In the hydrogen peroxide treating step, it is preferred to take advantage of the combined action of heat and hydrogen peroxide in killing the bactericidal organisms, and in particular the Salmonella organisms. Fortunately, this can be done by adding the hydrogen peroxide at substantially the same temperatures employed in the catalase inactivation step. It will be understood that temperatures above 130° F. should be avoided because of their adverse effect on the functional properties of the egg whites. Temperatures above 100° F. are generally satisfactory for the sterilization step, although somewhat lower temperatures can also be used.

The quantity of hydrogen peroxide employed for the sterilization is not especially critical. Preferably, the minimum amount is used consistent with an effective bactericidal action. Usually, an effective bactericidal action can be obtained after the inactivation of the catalase with concentrations of hydrogen peroxide in the egg whites as low as 0.075 to 0.3% by volume. However, if desired, concentrations as high as up to 1.5% of hydrogen peroxide in the liquid egg whites can be used, although the particular advantage of the preferred sequence of steps in the present method is that it permits the use of very low concentrations of hydrogen peroxide while obtaining an effective bactericidal action. At the preferred low concentrations, and with the periods of time usually allowed for the sterilization treatment, the hydrogen peroxide will substantially dissipate itself by decomposing into oxygen and water. However, if any undecomposed hydrogen peroxide remains and it is desired to decompose it, this can be done by adding a small amount of catalase to the sterilized egg whites. Usually, the hydrogen peroxide should be allowed to act on the egg whites for at least 0.5 minute and, if desired, the treatment can be continued for 10 to 15 minutes or even longer in many cases without a harmful effect on the functional properties of the egg whites. The sterilized egg whites can then be stored with or without freezing. Usually, however, it will be desired to freeze the egg whites after the sterilization treatment, or alternatively, to cool the egg whites at least to room temperature to prevent any impairment of their functional properties by greatly prolonged heating.

The egg white product obtained by the above process is commercially sterile, destruction of 99.99% and above of the bacteria present being accomplished. Absolute sterility may be achieved under the above method but it is found that a destruction of 99.99% of the bacteria renders the product commercially sterile.

The method of this invention is further illustrated by the following specific examples.

Example I 1,000 lbs. of freshly separated egg white was accumulated in a refrigerated coil vat. It was then pumped through a plate heat exchanger where it was heated within a second or two to 120° F. From the heat exchanger it flowed through a set of holding tubes of length sufficiency to give a holding time of approximately 2 minutes and into an open-top surge tank. Hydrogen peroxide (35%) was added continuously to the surge tank at a rate calculated to give a concentration of 0.2% peroxide in the egg white. The egg white-peroxide mixture was continuously pumped from the surge tank through sanitary pipe of length calculated to give a holding time of 2 minutes and into a coil vat with brine circulating in the rotating coil, where the egg white was immediately reduced to a temperature of 90° F. 0.5 grams of 1:3000 of catalase was added and the egg white cooled in the vat to 45° F. during the ensuing 1½ hours, after which it was filled in cans and frozen.

The egg white performed in the bakery in a fashion comparable to that of untreated egg white of the same raw material.

Example II 15,000 lbs. of frozen egg white was defrosted in a vat, warmed to 85° F., and fermented with yeast. The fermented liquid was then heated as in Example I and hydrogen peroxide added at a rate sufficient to give a concentration of 0.3% of peroxide in the egg white in the surge tank. The effluent egg white was cooled to 85° F. in a second heat exchanger and as it flowed into an accumulation vat, a dilute solution containing 7 grams of 1:3000 catalase was added. After all the egg white was in the vat, it was allowed to stand one hour to permit the catalase to complete the removal of the peroxide, and the liquid then spray dried.

The dried egg white performed in the manufacture of nougat cream in a manner similar to that of an untreated product.

Example III

A 1,000 lb. batch of fresh egg white was heated to 125° F. for 1 minute after which sufficient hydrogen peroxide was added to establish a concentration of 0.075%. The mixture was heated as previously described for an additional 5 minutes at the same temperature (125° F.). The temperature was immediately reduced thereafter to 85° F. and 7 grams of 1:3000 catalase was added to eliminate residual hydrogen peroxide in the egg white. After standing in the vat for 1 hour at 45° F., the egg white was packaged. Bacteriological examination revealed no traces of Salmonella organisms as in the preceeding examples.

While in the foregoing specification we have set out certain specific steps in considerable detail for the purpose of illustrating embodiments of the invention, it will be understood that such details may be varied widely by those skilled in the art without departing from the spirit of our invention.

We claim:

1. The method of preparing a substantially sterile egg white product, characterized by the steps of heating liquid egg whites for from .5 to 5 minutes at a temperature within the range from 100 to 130° F. to inactivate their indigenous catalase without impairing their functional properties, and then adding hydrogen peroxide to the liquid egg whites in bactericidal concentrations ranging between about 0.075 and about 1.5 percent by volume at a temperature between about 100 and 130° F. to substantially sterilize the egg whites.

2. The method of preparing a substantially sterile egg white product, characterized by the steps of heating liquid egg whites for 1 to 3 minutes at a temperature of from about 115 to 125° F. to inactivate their indigenous catalase without impairing their functional properties, and then adding hydrogen peroxide in minimum bactericidal concentrations ranging between about 0.075 and about 1.5 percent by volume at a temperature between about 100 and 130° F. to the liquid egg whites after they are substantially free of active catalase.

3. The method of preparing a substantially sterile egg white product, characterized by the steps of heating liquid egg whites for from .5 to 5 minutes at a temperature within the range from 100 to 130° F. to inactivate their indigenous catalase without impairing their functional properties, and then treating the active-catalase-free egg whites with bactericidal concentrations of hydrogen peroxide ranging from about .075 to .3% by volume at a temperature from about 100 to 130° F.

References Cited in the file of this patent

UNITED STATES PATENTS 779,637    Buddle _____ Jan. 10, 1905

FOREIGN PATENTS 303,530    Great Britain _____ Jan. 4, 1929

OTHER REFERENCES

"Disinfection and Sterilization," 1945, by E. C. Mc-Cullouch, published by Lea and Febriger, Philadelphia, page 371, article entitled Hydrogen Peroxide.